(12) United States Patent
Tominaga et al.

(10) Patent No.: US 6,457,565 B2
(45) Date of Patent: Oct. 1, 2002

(54) ELEVATOR APPARATUS WITH RECHARGEABLE POWER SUPPLY AND DISCHARGE CONTROL

(75) Inventors: Shinji Tominaga; Ikuro Suga; Shinobu Tajima; Hiroshi Araki; Kazuyuki Kobayashi, all of Tokyo (JP)

(73) Assignees: Mitsubishi Denki Kabushiki Kaisha, Tokyo (JP); The Tokyo Electric Power Company, Inc., Tokyo (JP)

( * ) Notice: Subject to any disclaimer, the term of this patent is extended or adjusted under 35 U.S.C. 154(b) by 0 days.

(21) Appl. No.: 09/774,025

(22) Filed: Jan. 31, 2001

(30) Foreign Application Priority Data

Feb. 28, 2000 (JP) ......................................... 2000-051942

(51) Int. Cl.⁷ ................................................. B66B 1/06
(52) U.S. Cl. ........................................ 187/290; 187/296
(58) Field of Search ................................. 187/290, 293, 187/296, 391, 393, 414; 312/375, 376, 138; 307/66, 68; 320/128, 130, 131, 132, 133, 135

(56) References Cited

U.S. PATENT DOCUMENTS

| 4,316,097 A | * | 2/1982 | Reynolds | 187/290 |
|---|---|---|---|---|
| 4,456,097 A | * | 6/1984 | Salihi | 187/289 |
| 4,506,766 A | * | 3/1985 | Watanabe | 187/290 |
| 4,554,999 A | * | 11/1985 | Kamaike | 187/290 |
| 4,657,117 A | * | 4/1987 | LAuer | 187/289 |
| 4,666,020 A | * | 5/1987 | Watanabe | 187/290 |
| 5,698,823 A | * | 12/1997 | Tanahashi | 187/296 |
| 5,712,456 A | | 1/1998 | McCarthy et al. | |
| 5,936,375 A | | 8/1999 | Enoki | |
| 6,121,740 A | * | 9/2000 | Gale et al. | 318/362 |
| 6,264,005 B1 | * | 7/2001 | Kang et al. | 187/290 |
| 6,315,081 B1 | * | 11/2001 | Yeo | 187/290 |

FOREIGN PATENT DOCUMENTS

| JP | 7-252040 | 10/1985 |
|---|---|---|
| JP | 61-267675 | 11/1986 |
| JP | 5-338947 | 12/1993 |
| JP | 10-67469 | 3/1998 |
| JP | 11-217193 | 8/1999 |

* cited by examiner

Primary Examiner—Jonathan Salata
(74) Attorney, Agent, or Firm—Leydig, Voit & Mayer, Ltd.

(57) ABSTRACT

An elevator control apparatus includes a converter, an inverter, a controller for controlling a motor based on AC power having a variable voltage and a variable frequency supplied from the inverter and operating an elevator; a power storage unit for storing DC power; a charge/discharge control circuit that issues a drive signal such that discharge from the power storage unit increases within a range of power that can be discharged when an elevator is driven immediately following completion of uniform charging; and a charge/discharge circuit for discharging the power storage unit in accordance with the drive signal. This arrangement permits quick discharging while effectively using discharge electric power until a state of charge is reached wherein regenerative electric power can be used for charging.

2 Claims, 10 Drawing Sheets

ELEVATOR APPARATUS WITH RECHARGEABLE POWER SUPPLY AND DISCHARGE CONTROL

BACKGROUND OF THE INVENTION

1. Field of the Invention

The present invention relates to an elevator control apparatus utilizing a power storage unit and, more particularly, to an elevator control apparatus capable of uniformly charging the power storage unit.

2. Description of the Related Art

A conventional elevator control apparatus will be described with reference to an accompanying drawing. FIG. 16 shows a construction of a conventional elevator control apparatus disclosed in, for example, Japanese Unexamined Patent Application Publication No. 61-267675.

The conventional elevator control apparatus shown in FIG. 16 includes a commercial three-phase AC power source 1, a converter 2 composed of diodes or the like, a capacitor 3, an inverter 4, a motor 5, such as an induction motor, a hoisting machine 6, an elevator car 7, a counterweight 8, and a rope 9. The control apparatus further includes a power storage unit 10 composed of a battery, a charging and discharging (hereinafter referred to as "charge/discharge) circuit 11 composed of a DC/DC converter or the like for performing power conversion in both directions between two different DC voltages of a battery voltage and an inverter input voltage, a charge/discharge control circuit 12 for controlling the charge/discharge circuit 11 as to the direction of power conversion and battery currents, a voltage detector 13, a voltage detector 14 for the power source 1, a battery current detector 15, and a battery charge amount detector 16.

An operation of the aforesaid conventional elevator control apparatus will now be described with reference to the drawing.

If the AC power source 1 incurs a power failure, power is supplied from the power storage unit 10 to an input section of the inverter 4 by the charge/discharge circuit 11 so as to drive the motor 5 by the inverter 4 thereby to land an elevator.

In normal operation, if an inverter input voltage drops while an elevator is accelerating, then power is supplied from the power storage unit 10 to the input section of the inverter 4 by the charge/discharge circuit 11 so as to restrain a voltage drop in the input section of the inverter 4.

Conversely, if the inverter input voltage rises due to regenerative electric power from the motor 5 while an elevator is being braked, then power is supplied from the input section of the inverter 4 to the power storage unit 10 by the charge/discharge circuit 11 so as to charge the power storage unit 10. When a charge amount of the power storage unit 10 becomes low, power is supplied from the input section of the inverter 4 to the power storage unit 10 by the charge/discharge circuit 11 to charge the power storage unit 10.

The conventional elevator control apparatus described above employs a battery as the power storage unit, and the state of charge of the battery cannot be always maintained at 100% due to repeated charging and discharging of the battery according to an operation state of an elevator, or for ensuring an allowance for charging regenerative electric power. As a result, an inactive material is generated in the battery, presenting a problem in that an apparent charging capacity of the battery decreases with a consequent shortened life of the battery.

SUMMARY OF THE INVENTION

The present invention has been made with a view toward solving the problems mentioned above, and it is an object of the present invention to provide an elevator control apparatus capable of restraining a drop in charging capacity of a battery and deterioration of the battery, and also capable of conducting control to ensure economical charging and discharging of the battery by minimizing waste of electric power.

To this end, according to one aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge control circuit that issues a drive signal such that an amount of discharge from the power storage unit increases within a range of power that can be discharged when an elevator is driven immediately following completion of uniform charging; and a charge/discharge circuit for carrying out discharge from the power storage unit in accordance with the drive signal.

In a preferred form of the elevator control apparatus in accordance with the present invention, the charge/discharge control circuit sets the discharge amount of the power storage unit to a preset maximum value until a preset reference value of a charge state is reached, immediately following the completion of the uniform charging.

According to another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge control circuit that issues a drive signal for controlling charge current to a predetermined constant current value when charging the power storage unit with regenerative electric power if a charge state of the power storage unit indicates a predetermined value or more immediately following completion of uniform charging; and a charge/discharge circuit for charging the power storage unit with the regenerative electric power in accordance with the drive signal.

According to yet another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge control circuit that issues a drive signal for starting uniform charging of the power storage unit at a preset time when the elevator is less frequently used; and a charge/discharge circuit for starting the uniform charging of the power storage unit in accordance with the drive signal.

In another preferred form of the elevator control apparatus of the present invention, the charge/discharge control circuit issues a drive signal for starting uniform charging of the power storage unit at a preset time in the nighttime.

According to still another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge control circuit that issues a drive signal for performing uniform charging of the power storage unit during a halt of the elevator based on information regarding an elevator operation supplied by the controller, measures a time of the uniform charging by a timer, issues a drive signal for interrupting the uniform charging and stopping the timer when the elevator is being started, totalizes an amount of discharge from the power storage unit up to that moment, and, when the elevator is stopped again, issues a drive signal for correcting a charging time corresponding to the totalized amount of discharge based on the uniform charging time measured by the timer before restarting the uniform charging, and also restarts measurement of uniform charging time by the timer; and a charge/discharge circuit for starting or interrupting uniform charging of the power storage unit in accordance with the drive signals.

According to a further aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge control circuit that issues a drive signal for starting uniform charging of the power storage unit when a preset two or more days have passed from a day when, previous uniform charging was started; and a charge/discharge circuit that starts uniform charging of the power storage unit in accordance with the drive signal.

In a preferred form of the elevator control apparatus according to the present invention, the charge/discharge control circuit issues a drive signal for starting uniform charging of the power storage unit on a preset day of the week when the elevator is used less frequently.

According to another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge circuit for charging the power storage unit and causing the power storage unit to discharge according to a drive signal; and a charge/discharge control circuit that controls a charge state of the power storage unit and outputs a drive signal for charging the power storage unit or causing the power storage unit to discharge, and changes a set application range of the charge state of the power storage unit based on an open circuit voltage of the power storage unit immediately following completion of uniform charge.

According to a further aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge circuit for charging the power storage unit and causing the power storage unit to discharge-according to a drive signal; and a charge/discharge control circuit that controls a charge state of the power storage unit and outputs a drive signal for charging the power storage unit or causing the power storage unit to discharge, and corrects the charge state immediately following completion of uniform charge of the power storage unit.

In a preferred form of the elevator control apparatus according to the present invention, the charge/discharge control circuit sets the charge state of the power storage unit immediately following completion of uniform charging of the power storage unit to 100%.

In another preferred form of the elevator control apparatus according to-the present invention, the charge/discharge control circuit decides a value of a fully charged state of the power storage unit based on an open circuit voltage of the power storage unit immediately following completion of uniform charge of the power storage unit.

According to another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge circuit for charging the power storage unit and causing the power storage unit to discharge according to a drive signal; and a charge/discharge control circuit that controls a charge state of the power storage unit and outputs a drive signal for charging the power storage unit or causing the power storage unit to discharge, performs uniform charging of the power storage unit at constant current in a plurality of steps, and if a charge state of the power storage unit exceeds 100%, maintains the charge state of the power storage unit at 100% until discharge from the power storage unit is carried out, even when more than 100% charging is performed.

According to another aspect of the present invention, there is provided an elevator control apparatus including: a converter for rectifying AC power into DC power; an inverter for converting the DC power into AC power of a variable voltage and a variable frequency; a controller for controlling a motor based on the AC power of the variable voltage and the variable frequency so as to operate an elevator; a power storage unit for storing the DC power; a charge/discharge circuit for charging the power storage unit and causing the power storage unit to discharge according to a drive signal; and a charge/discharge control circuit that controls a charge state of the power storage unit and outputs a drive signal for charging the power storage unit or causing the power storage unit to discharge, and calculates a current value that is uniquely determined relative to a value obtained by detecting a charge current supplied to the power storage unit, a DC bus voltage output by the converter, and a voltage of the power storage unit, and a charge current command value so as to provide a command value, and PWM-controls the charge/discharge circuit thereby to control the charge current supplied to the power storage unit by using the command value.

DESCRIPTION OF THE PREFERRED EMBODIMENTS

First Embodiment

Figure 1:
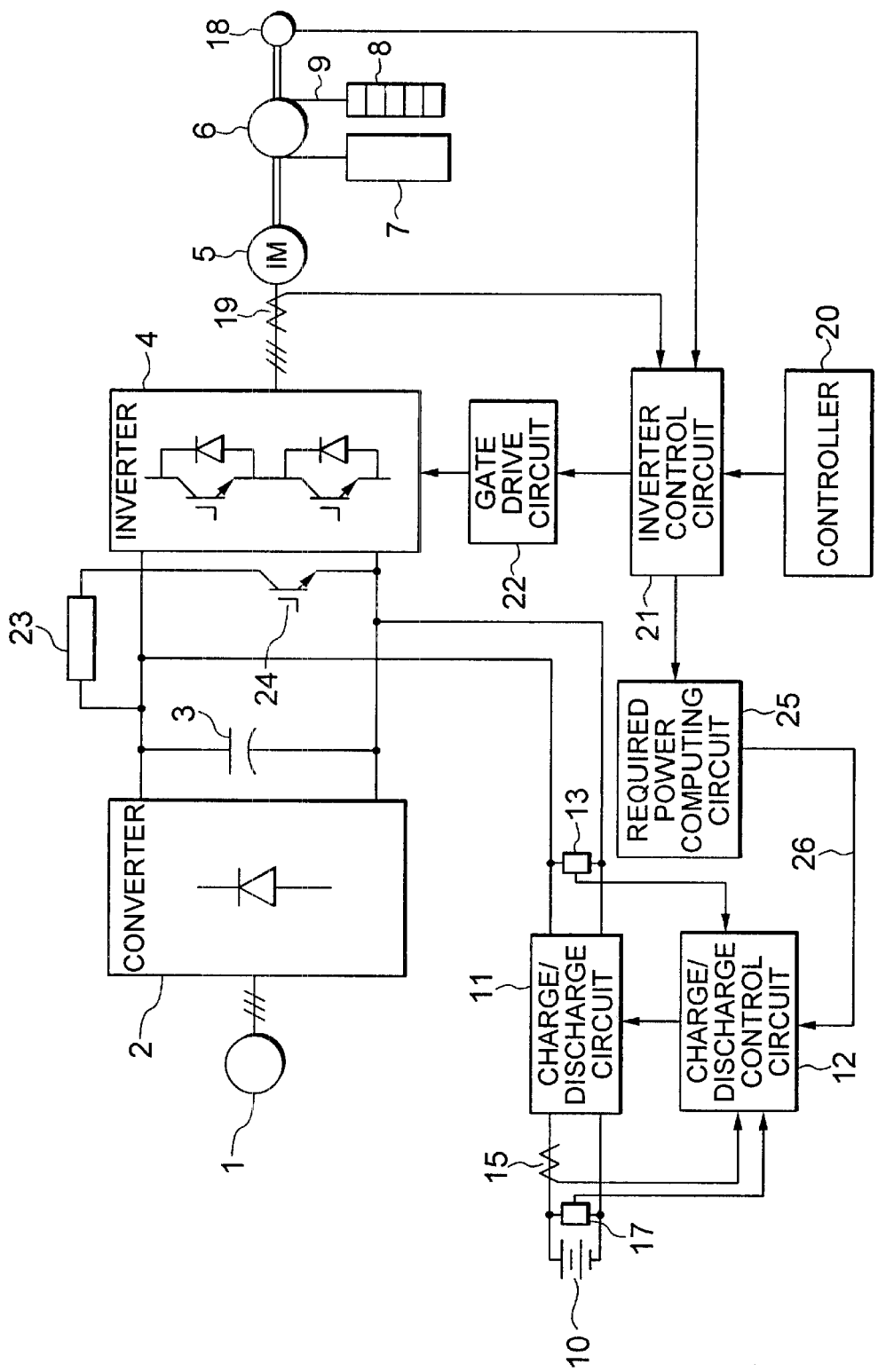
FIG. 1 is a block diagram showing a construction of an elevator control apparatus according to a first embodiment of the present invention.

An elevator control apparatus according to a first embodiment of the present invention will be described in conjunction with the accompanying drawings. FIG. 1 is a diagram showing a construction of the elevator control apparatus according to the first embodiment of the invention. In the drawings, the like reference numerals will denote like or equivalent components.

The elevator control apparatus shown in FIG. 1 includes a commercial three-phase AC power source 1, a converter 2, a capacitor 3, an inverter 4, a motor 5, such as an induction motor, a hoisting machine 6, an elevator car 7, a counterweight 8, and a rope 9.

The motor 5 rotationally drives the hoisting machine 6 to move the elevator car 7 and the counterweight 8 connected to the two ends of the rope 9 so as to carry passengers in the car 7 to a predetermined floor level.

The converter 2 composed of diodes or the like rectifies AC power supplied from the AC power source 1 to convert it into DC power. The inverter 4 composed of transistors, IGBTs or the like converts DC power into AC power of a variable voltage and a variable frequency.

The elevator control apparatus shown in the drawing further includes a power storage unit 10 composed of a battery or the like, a charge/discharge circuit 11 composed of a DC/DC converter or the like, a charge/discharge control circuit 12 which is equipped with a clocking function and controls charge and discharge power of the charge/discharge circuit 11, a voltage detector 13, a current detector 15 composed of a current transformer or the like for detecting input/output currents of the power storage unit 10, a voltage detector 17, an encoder 18, and a current detector 19.

The elevator control apparatus shown in the drawing further includes a controller 20, an inverter control circuit 21, a gate drive circuit 22, a resistor 23, a switching means 24 composed of an IGBT or the like, a required power computing circuit 25 for computing required power of an elevator, and a communication cable 26 for transmitting a signal indicating the required power computed by the required power computing circuit 25.

The controller 20 controls start and stop of the elevator, and also creates instructions for start/stop positions and speeds. Based on commands of the controller 20, the inverter control circuit 21 rotationally drives the motor 5 based on current feedback from the current detector 19 and speed feedback from an encoder 18 mounted on the hoisting machine 6 so as to implement the control of the position and speed of the elevator. At this time, the inverter control circuit 21 controls output voltage and frequency of the inverter 4 via the gate drive circuit 22.

If a voltage applied to the capacitor 3 exceeds a predetermined value, the controller 20 turns on the switching means 24 to pass current through the resistor 23 so as to thermally consume a part of power stored in the capacitor 3. When the voltage of the capacitor 3 lowers to a predetermined value or less, the switching means 24 is turned off.

The counterweight 8 of the elevator is set such that it is balanced when the car 7 is loaded with a moderate number of passengers. For example, when the elevator travels in a balanced state, it is possible to increase the speed of the elevator while consuming electric power in an acceleration mode, and to turn accumulated speed energy back into electric power in a deceleration mode.

Figure 2:
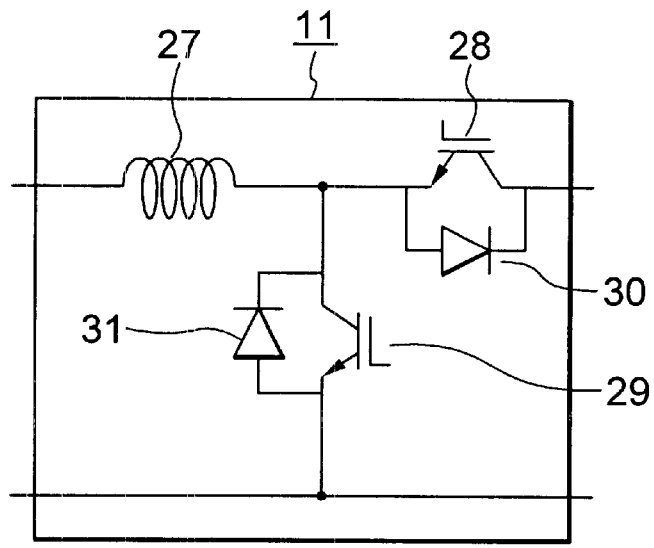
FIG. 2 is a circuit diagram showing a configuration of a charge/discharge circuit of the elevator control apparatus according to the first embodiment of the present invention.

FIG. 2 shows a circuit configuration of the charge/discharge circuit of FIG. 1. Referring to FIG. 2, reference numeral 27 denotes a reactor, reference numerals 28 and 29 denote switching devices, such as IGBTs or the like, and reference numerals 30 and 31 denote diodes that are connected inversely in parallel.

The power storage unit 10 is charged by a step-down chopper circuit formed by the switching device 28 and the diode 31. Discharging from the power storage unit 10 is performed by a step up chopper circuit formed by the switching device 29 and the diode 30.

Figure 3:
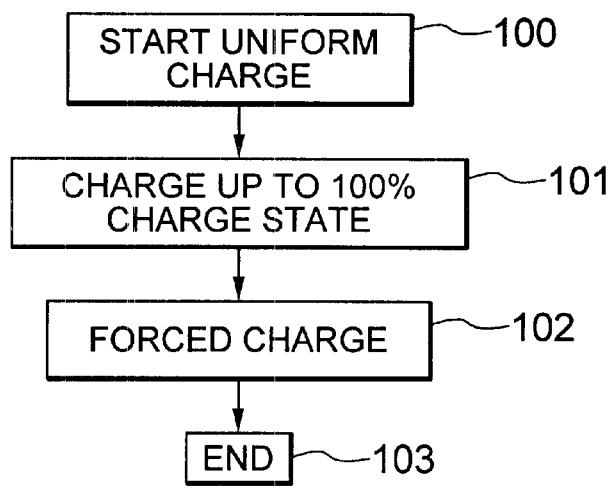
FIG. 3 is a flowchart showing a uniform charging operation of the elevator control apparatus according to the first embodiment of the present invention.
Figure 4:
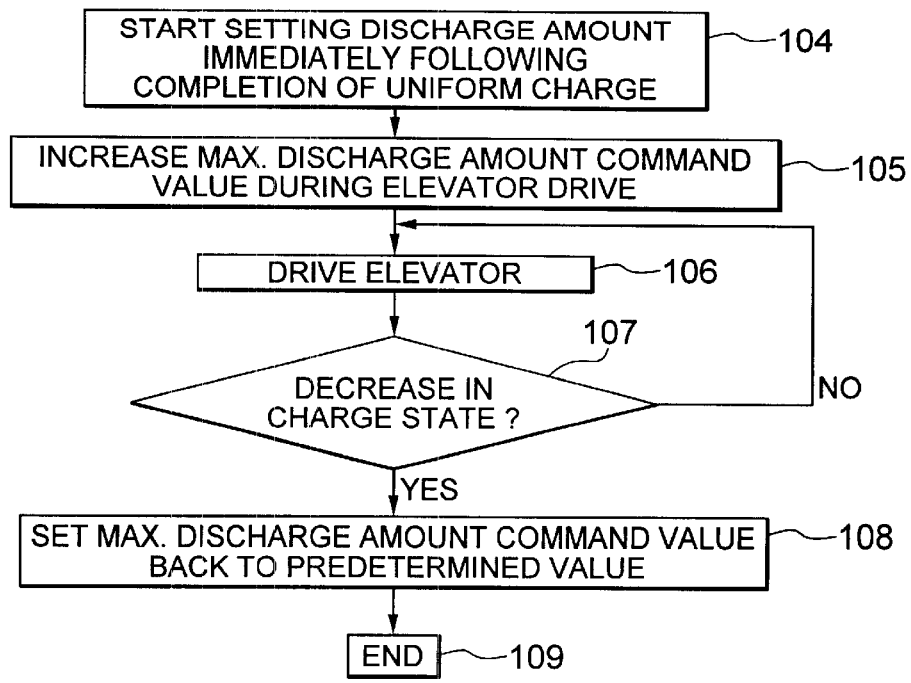
FIG. 4 is a flowchart showing an operation for setting a discharge amount immediately following completion of uniform charging of the elevator control apparatus according to the first embodiment of the present invention.

The operation of the elevator control apparatus according to the first embodiment will now be described with reference to the accompanying drawings. FIG. 3 is a flowchart illustrating a uniform charging operation of the elevator control apparatus according to the first embodiment of the present invention. FIG. 4 is a flowchart illustrating an operation for setting a discharge amount immediately following completion of uniform charging of the elevator control apparatus according to the first embodiment of the present invention.

First, charging is performed by the charge/discharge circuit 11 until the state of charge of the power storage unit 10 reaches 100% (steps 100 and 101). More specifically, the charge/discharge control circuit 12 turns on the switching device 28 of the charge/discharge circuit 11 in response to a drive signal at a predetermined timing so as to begin uniform charging of the power storage unit 10. A charge amount is totalized based on, for example, a voltage of the power storage unit 10 detected by the voltage detector 17 and a charge current detected by the current detector 15, and the charging at a constant current is continued until the totalized value reaches the 100% charge state.

Thereafter, forced charging is further performed (steps 102 and 103) thereby to activate an inert material accumulated in the power storage unit 10, thus permitting initial charge/discharge performance to be restored. More specifically, after the state of charge of the power storage unit 10 reaches 100%, the charge/discharge control circuit 12 further continues the constant current charging until the voltage that has dropped once reaches a predetermined voltage, then terminates the uniform charging when a predetermined time passes.

Immediately following completion of the uniform charging, a command value of the amount of maximum discharge from the power storage unit 10 while the elevator is being driven is increased within a range in which electric power can be discharged (steps 104 and 105). To be more specific, the charge/discharge control circuit 12 acquires operational information, such as start and stop of the elevator, from the controller 20 through a communication cable (not shown), and increases, for example, the proportion of ON time of ON/OFF times of the switching device 29 of the charge/discharge circuit 11.

Then, after the state of charge of the power storage unit 10 drops due to the drive of the elevator, the maximum discharge amount command value is set back to a predetermined value (steps 106 to 109). More specifically, the charge/discharge control circuit 12 always monitors discharge current and the voltage of the power storage unit 10 by the current detector 15 and the voltage detector 17, and calculates the discharge amount based on the discharge current and the voltage. Then, based on the calculated discharge amount, the charge/discharge control circuit 12 determines that the charge state of the power storage unit 10 has dropped.

The elevator control apparatus constructed and operated as described above permits discharged electric power to be effectively used for driving the elevator and allows quick discharge over a wide range of the charge state of the power storage unit 10 from a high charge state immediately after completion of uniform charging to a charge state in which regenerative electric power can be charged.

Second Embodiment

An elevator control apparatus according to a second embodiment of the present invention will be described with reference to an accompanying drawing. A construction of the elevator control apparatus according to the second embodiment of the invention is the same as that of the first embodiment discussed above.

Figure 5:
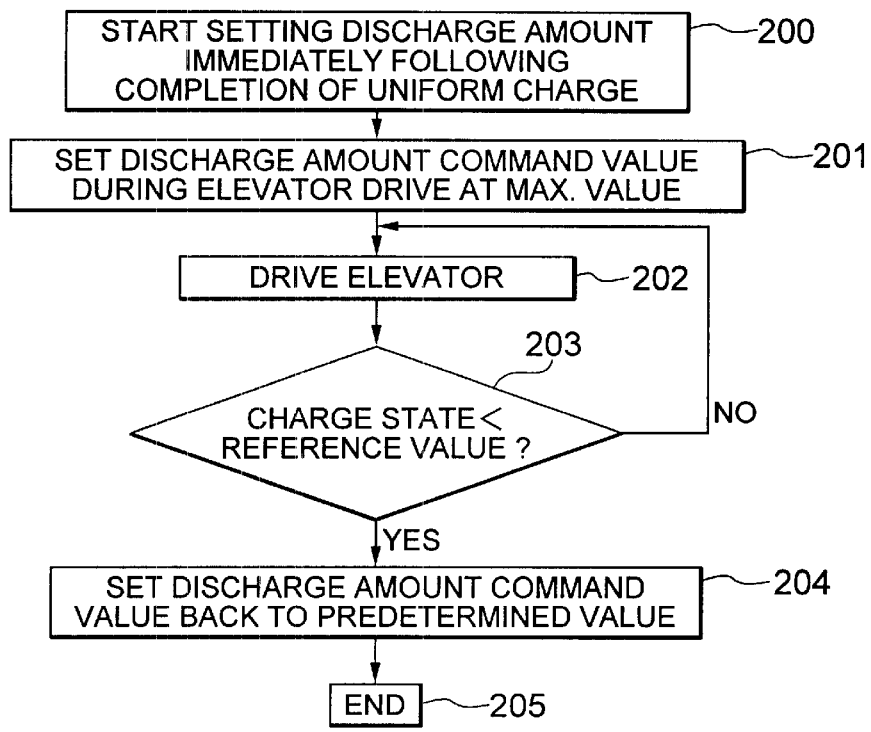
FIG. 5 is a flowchart showing an operation for setting a discharge amount immediately following completion of uniform charging of an elevator control apparatus according to a second embodiment of the present invention.

An operation of the elevator control apparatus according to the second embodiment will now be described in conjunction with the drawing. FIG. 5 is a flowchart illustrating an operation for setting a discharge amount immediately after completion of uniform charging of the elevator control apparatus according to the second embodiment of the present invention.

In the first embodiment, the command value of the amount of the maximum discharge from the power storage unit 10 was increased within a range in which electric power can be released. The second embodiment sets a preset maximum value of electric power that can be discharged (steps 200 and 201), and after the elevator is driven and the charge state of the power storage unit 10 reaches a preset reference value, the maximum discharge amount command value is set back to a predetermined value (steps 202 through 205).

The elevator control apparatus constructed and operated as described above permits discharged electric power to be effectively used for driving the elevator and allows quickest discharge over a wide range of the charge state of the power storage unit 10 from a high charge state immediately after completion of uniform charging to a charge state in which regenerative electric power can be effectively charged.

Third Embodiment

An elevator control apparatus according to a third embodiment of the present invention will be described with reference to an accompanying drawing. A construction of the elevator control apparatus according to the third embodiment of the invention is the same as that of the first embodiment discussed above.

Figure 6:
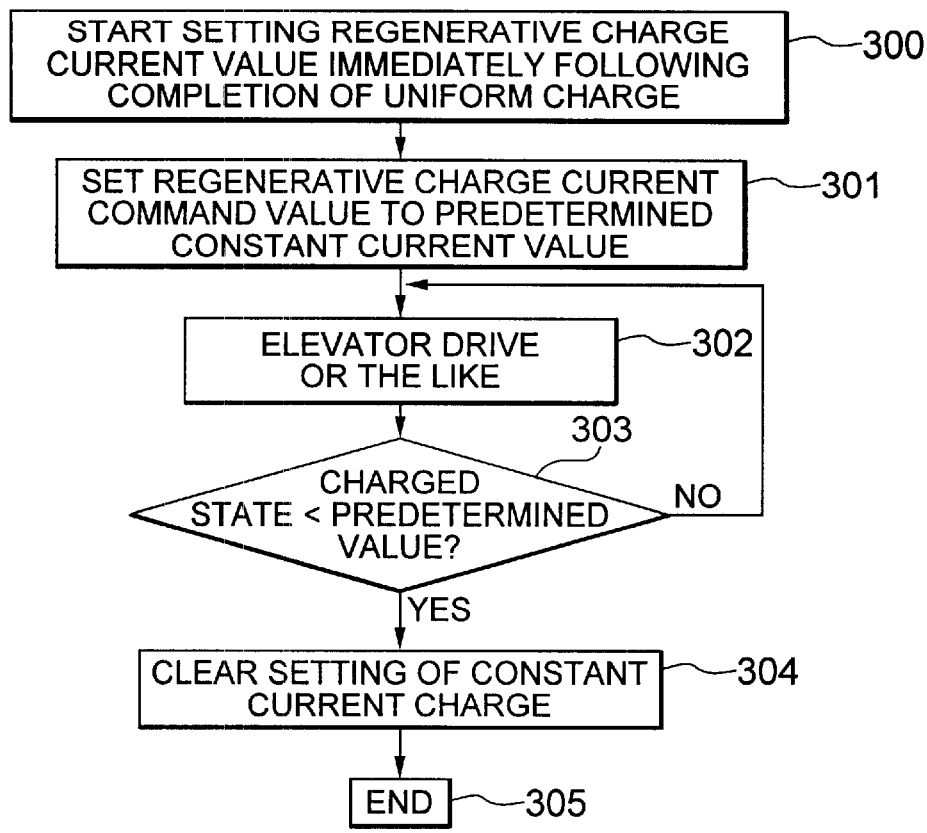
FIG. 6 is a flowchart showing an operation for setting a regenerative charge current value immediately following completion of uniform charging of an elevator control apparatus according to a third embodiment of the present invention.

An operation of the elevator control apparatus according to the third embodiment will now be described in conjunction with the drawing. FIG. 6 is a flowchart illustrating an operation for setting a regenerative charge current value immediately after completion of uniform charging of the elevator control apparatus according to the third embodiment of the present invention.

Referring to FIG. 6, after completion of uniform charging, a command value of a charge current at which regenerative electric power is charged into the power storage unit 10 is set as a predetermined constant current value (steps 300 and 301). To be more specific, the regenerative charge current is normally a current that fluctuates in proportion to regenerative electric power. Therefore, a charge/discharge control circuit 12 sets a regenerative charge current command value internally used as a constant current value so as to control the charge/discharge circuit 11 at the constant current.

Thereafter, when the charge state of the power storage unit 10 reaches a predetermined value or less due to the drive of the elevator or the like, the setting for the constant current charging is cleared (steps 302 through 305).

In the elevator control apparatus constructed and operated as described above, the charge state of the power storage unit 10 after completion of uniform charging is high, if and even in a state where regenerative electric power cannot be sufficiently charged, maximum electric power (out of all regenerative electric power) that can be charged into the power storage unit 10 can be charged by constant current charging at a predetermined current value. At this time, a part of the regenerative electric power that cannot be charged into the power storage unit 10 is charged into a capacitor 3, and thermally consumed by a resistor 23 if a voltage of the capacitor 3 reaches a predetermined value or more.

Fourth Embodiment

An elevator control apparatus according to a fourth embodiment of the present invention will be described with reference to an accompanying drawing. A construction of the elevator control apparatus according to the fourth embodiment of the invention is the same as that of the first embodiment discussed above.

Figure 7:
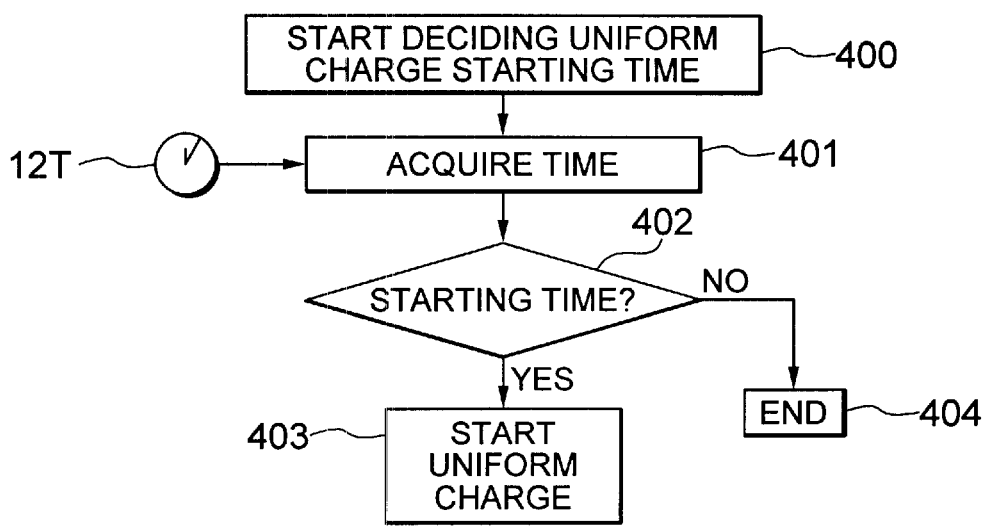
FIG. 7 is a flowchart showing an operation for determining a starting time of uniform charging of an elevator control apparatus according to a fourth embodiment of the present invention.

An operation of the elevator control apparatus according to the fourth embodiment will now be described in conjunction with the drawing. FIG. 7 is a flowchart illustrating an operation for deciding a starting time for uniform charging of the elevator control apparatus according to the fourth embodiment of the present invention.

Referring to FIG. 7, a charge/discharge control circuit 12 acquires a current time from a built-in clock device 12T (steps 400 and 401), and starts the uniform charging if the acquired time indicates a preset time for starting the uniform charging (steps 402 and 403).

The elevator control apparatus constructed and operated as described above is able to restrain the number of interruptions of uniform charging and to sufficiently impart effect of uniform charging to a power storage unit 10 by setting the time for starting uniform charging so as to carry out the uniform charging in a time zone wherein an elevator is used less frequently.

Fifth Embodiment

In the fourth embodiment discussed above, the time for starting uniform charging was set so as to implement the uniform charging in a time zone wherein an elevator is used less frequently. In a fifth embodiment, the time zone for carrying out uniform charging is set so as to start the uniform charging during nighttime when most elevators are used less frequently. The fifth embodiment provides an advantage in that electricity rate can be reduced because nighttime electricity rate is applied, in addition to the same advantages as those of the fourth embodiment. Moreover, using electric power during nighttime enables leveled load of electric power to be achieved, contributing to solution of environmental issues.

Sixth Embodiment

An elevator control apparatus according to a sixth embodiment of the present invention will be described with reference to an accompanying drawing. A construction of the elevator control apparatus according to the sixth embodiment of the invention is the same as that of the first embodiment discussed above.

Figure 8:
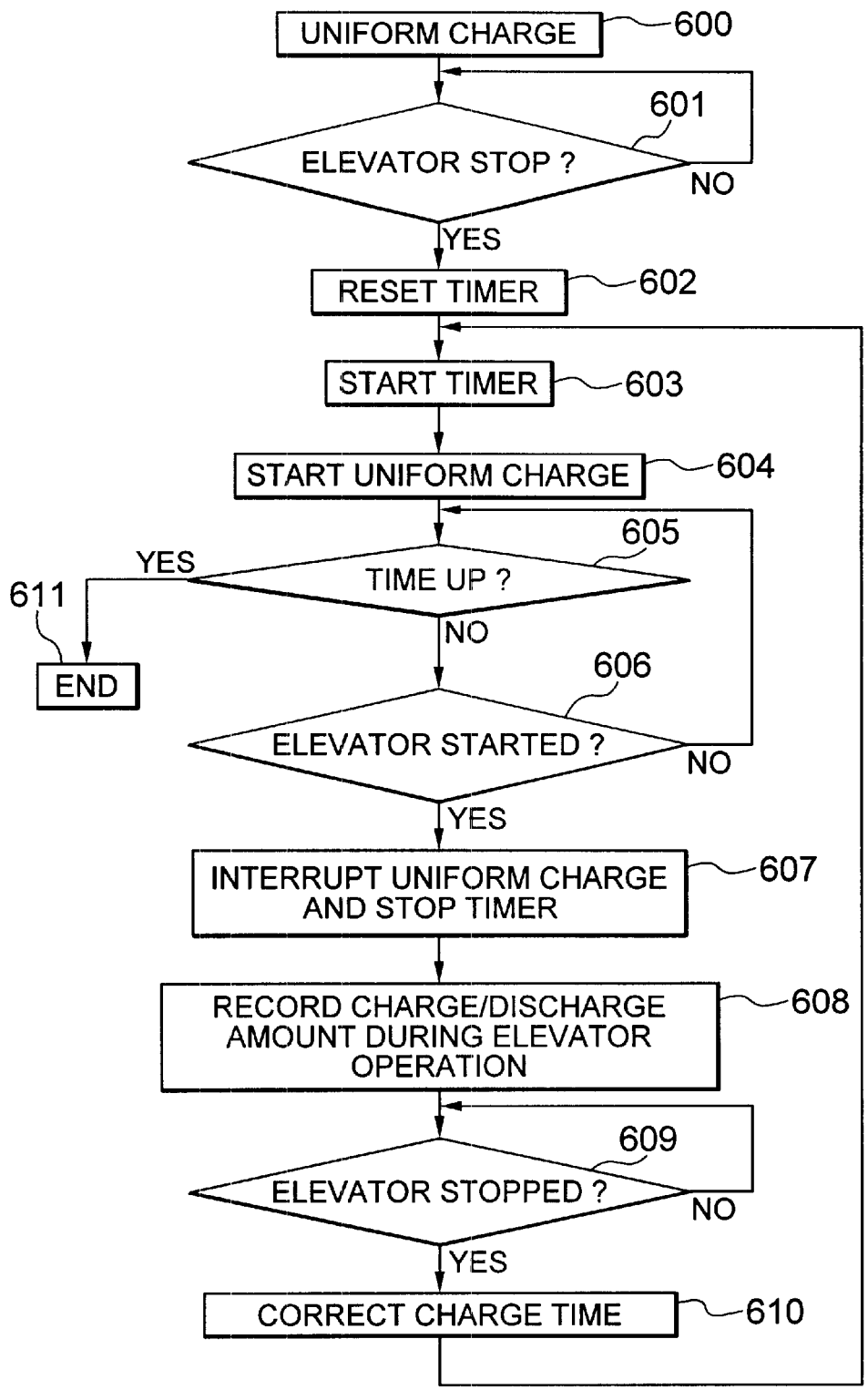
FIG. 8 is a flowchart showing an operation for correcting and determining starting and implementing time of uniform charging of an elevator control apparatus according to a sixth embodiment of the present invention.

An operation of the elevator control apparatus according to the sixth embodiment will now be described in conjunction with the drawing. FIG. 8 is a flowchart illustrating an operation for deciding a starting time and a correcting implementation time of uniform charging of the elevator control apparatus according to the sixth embodiment of the present invention.

Referring to FIG. 8, a charge/discharge control circuit 12 starts uniform charging during a halt of an elevator if it is a time for starting uniform charging (steps 600 and 601). Prior to the start, a timer built in the charge/discharge control circuit 12 is reset (step 602), and measurement of the uniform charging time by the timer is begun (step 603). The time of the measurement by the timer corresponds to the predetermined time for carrying out forced charging explained in the first embodiment. The charge/discharge control circuit 12 obtains operational information, such as start and stop, regarding the elevator from a controller 20 through a communication cable (not shown).

After the uniform charging is begun, the uniform charging is continued if the elevator remains at a halt, or if the uniform charging is interrupted if a start of the elevator is detected and the timer is stopped (steps 604 through 607). When the timer reaches the above predetermined time, the uniform charging is ended (steps 605 and 611).

While the elevator is in operation, amounts of charging and discharging into and from a power storage unit 10 are totalized, and a charging time measured by the timer is corrected based on a charging time that corresponds to a charging and discharging time after a halt of the elevator. Then, the uniform charging and the measurement by the timer are restarted (steps 608 through 610).

In the elevator control apparatus constructed and operated as described above, uniform charging can be continuously performed during a halt of the elevator. When the uniform charging is interrupted due to a start of the elevator, the measurement of a charging time by the timer and the correction of the charging time based on a result of the measurement of a charge or discharge amount while the elevator is being driven make it possible to complete uniform charging without causing insufficiency in charging amount after the uniform charging is restarted.

Seventh Embodiment

An elevator control apparatus according to a seventh embodiment of the present invention will be described with reference to an accompanying drawing. A construction of the elevator control apparatus according to the seventh embodiment of the invention is the same as that of the first embodiment discussed above.

Figure 9:
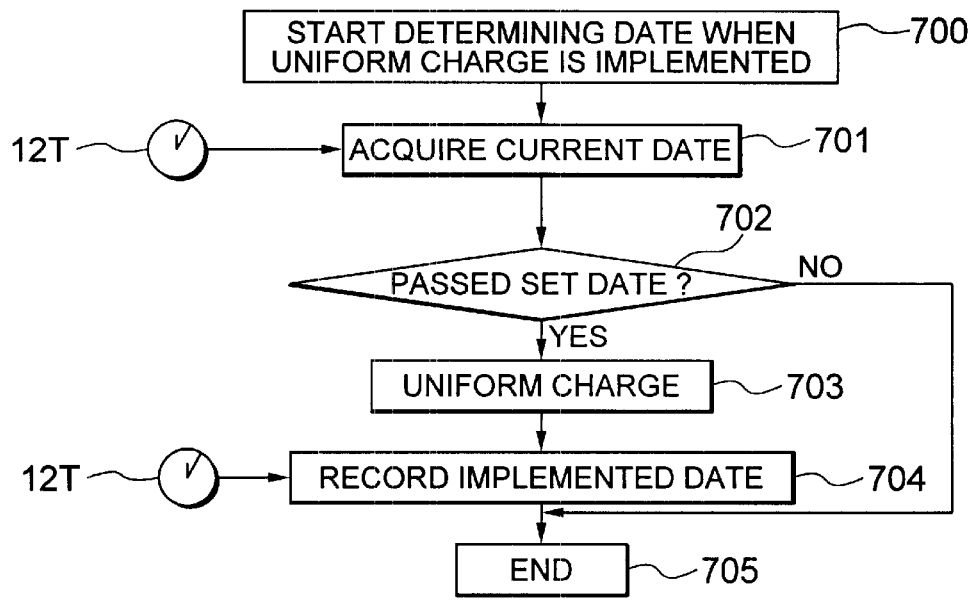
FIG. 9 is a flowchart showing an operation for determining a day for implementing uniform charging of an elevator control apparatus according to a seventh embodiment of the present invention.

An operation of the elevator control apparatus according to the seventh embodiment will now be described in conjunction with the drawing. FIG. 9 is a flowchart illustrating an operation for determining an implementation day of uniform charging of the elevator control apparatus according to the seventh embodiment of the present invention.

Referring to FIG. 9, a charge/discharge control circuit 12 acquires a current date from a built-in clock device 12T. If a preset number of days, e.g. two or more days, have passed since a day when a previous uniform charging was implemented as recorded in a memory or the like, then uniform charging is performed (steps 700 through 703). After completion of uniform charging, the date is acquired from the clock device 12T and recorded in a memory or the like (steps 704 and 705).

The elevator control apparatus constructed and operated as described above permits electricity rate to be reduced by avoiding performing uniform charging daily, that is, by reducing the frequency of uniform charging.

Eighth Embodiment

An elevator control apparatus according to an eighth embodiment of the present invention will be described with reference to an accompanying drawing. A construction of the elevator control apparatus according to the eighth embodiment of the invention is the same as that of the first embodiment discussed above.

Figure 10:
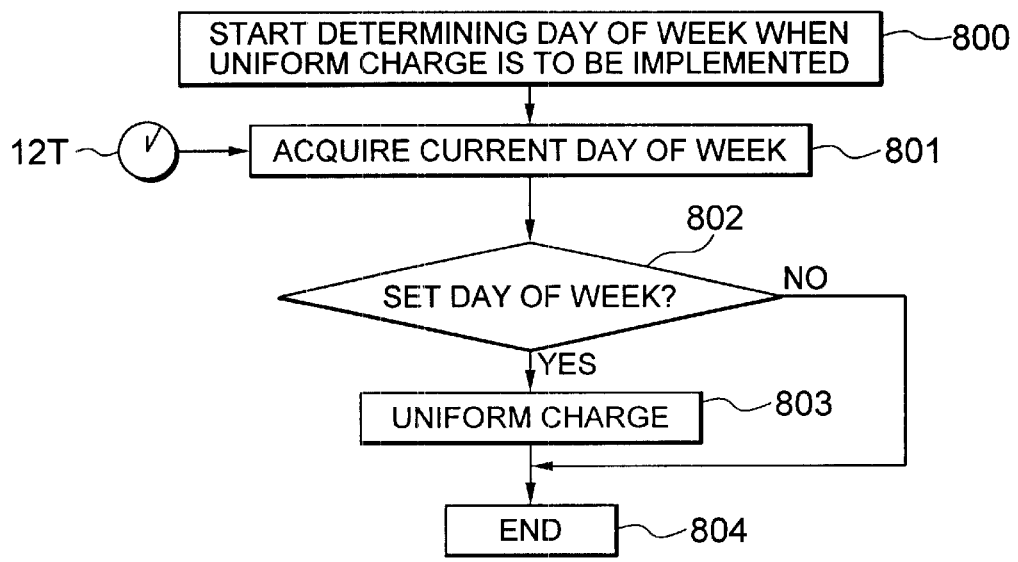
FIG. 10 is a flowchart showing an operation for determining a day of the week for implementing uniform charging of an elevator control apparatus according to an eighth embodiment of the present invention.

An operation of the elevator control apparatus according to the eighth embodiment will now be described in conjunction with the drawing. FIG. 10 is a flowchart illustrating an operation for determining an implementation day of the week of uniform charging of the elevator control apparatus according to the eighth embodiment of the present invention.

Referring to FIG. 10, a charge/discharge control circuit 12 acquires a current day of the week from a built-in clock device 12T, and if the date is a preset day of the week, then uniform charging is performed (steps 800 through 804).

The elevator control apparatus constructed and operated as described above provides the same advantage as that of the foregoing seventh embodiment and also provides the same advantage as that of the fourth embodiment by selecting a day of the week when an elevator is used less frequently, e.g. Sundays, in an office building.

Ninth Embodiment

An elevator control apparatus according to a ninth embodiment of the present invention will be described with reference to an accompanying drawing. A construction of the elevator control apparatus according to the ninth embodiment of the invention is the same as that of the first embodiment discussed above.

Figure 11:
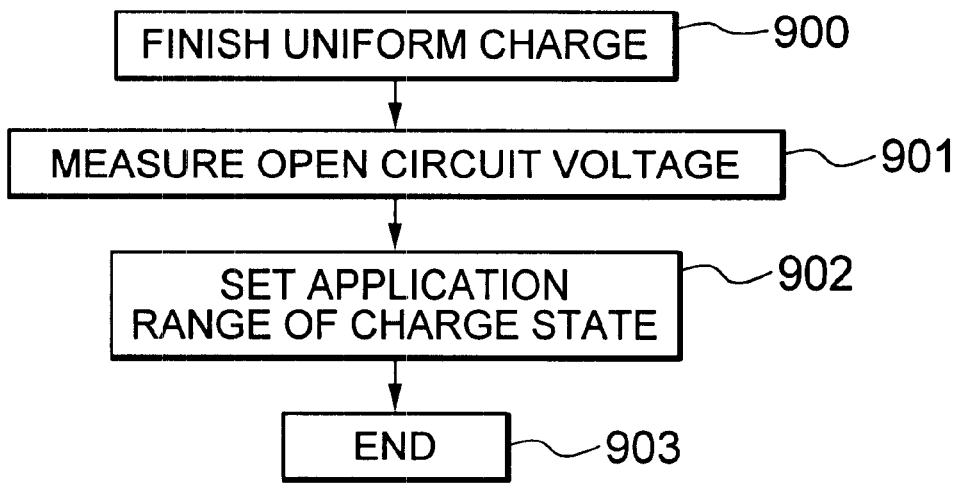
FIG. 11 is a flowchart showing an operation of controlling a charge state after completion of uniform charging of an elevator control apparatus according to a ninth embodiment of the present invention.

An operation of the elevator control apparatus according to the ninth embodiment will now be described in conjunction with the drawing. FIG. 11 is a flowchart illustrating an operation for controlling a state of charge after completion of uniform charging in the elevator control apparatus according to the ninth embodiment of the present invention.

Referring to FIG. 11, an open circuit voltage of a power storage unit 10 is measured upon completion of uniform charging. Based on the measured voltage, a range of the charge state of the power storage unit 10 used for driving an elevator is set (steps 900 through 903).

The charge/discharge control circuit 12 presumes deterioration of the power storage unit 10 by measuring the open circuit voltage of the power storage unit 10 by a voltage detector 17. Based on the deterioration, the charge state of the power storage unit 10 is determined. When the power storage unit 10 is new, the charge state will be 100% upon completion of uniform charging. When the power storage unit 10 becomes older, the charge state upon completion of uniform charging does not reach 100% due to deterioration.

Hence, if the charge state of the power storage unit 10 upon completion of uniform charging is always defined as 100% regardless of a degree of deterioration, then the charge/discharge control circuit 12 sets an applicable charge state range to, for example, 50% to 80% while the power storage unit 10 is new. If the charge/discharge control circuit 12 determines from a measured open circuit voltage that the power storage unit 10 has deteriorated, then it sets the range to, for example, 55% to 85%.

The elevator control apparatus constructed and operated as described above makes it possible to know deterioration of the power storage unit 10 from the open circuit voltage of the power storage unit 10 in a certain reference condition, such as upon completion of uniform charging. Thus, by setting the charge state range of the power storage unit 10 used for driving the elevator according to the deterioration, charging and discharging can be effectively performed, and sufficient electric power required for an emergency can be secured.

Tenth Embodiment

An elevator control apparatus according to a tenth embodiment of the present invention will be described with reference to an accompanying drawing. A construction of the elevator control apparatus according to the tenth embodiment of the invention is the same as that of the first embodiment discussed above.

Figure 12:
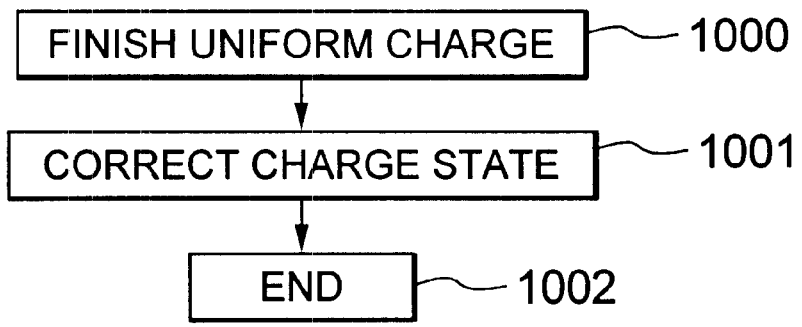
FIG. 12 is a flowchart showing an operation of controlling a charge state after completion of uniform charging of an elevator control apparatus according to a tenth embodiment of the present invention.

An operation of the elevator control apparatus according to the tenth embodiment will now be described in conjunction with the drawing. FIG. 12 is a flowchart illustrating an operation for controlling a state of charge after completion of uniform charging in the elevator control apparatus according to the tenth embodiment of the present invention.

Referring to FIG. 12, upon completion of uniform charging, the charge state of a power storage unit 10 grasped by a charge/discharge control circuit 12 is corrected to a preset value (steps 1000 through 1002). More specifically, the charge/discharge control circuit 12 grasps the charge state of the power storage unit 10 by totalizing a charge amount from, for example, a voltage of the power storage unit 10 detected by a voltage detector 17 and a charge current detected by a current detector 15.

Errors of the charge state of the power storage unit 10 grasped by the charge/discharge control circuit 12 are gradually accumulated as charging into and discharging from the power storage unit 10 are performed while an elevator is driven. The elevator control apparatus constructed and operated as described above has a reference state, which is immediately after completion of uniform charging, so that errors of charge states can be eliminated by making corrections based on a preset charge state. This feature allows accurate control of a charge state.

Eleventh Embodiment

In the tenth embodiment, the set value used for correcting the charge state of the power storage unit 10 immediately following completion of uniform charging may be 100% since it is a fully charged state immediately following completion of uniform charging. In this case also, the same advantage can be obtained.

Twelfth Embodiment

In the tenth embodiment, regarding the set value used for correcting the charge state of the power storage unit 10 immediately following completion of uniform charging, the deterioration of the power storage unit 10 may be presumed based on the open circuit voltage of the power storage unit 10 immediately following uniform charging, and a correction may be started from 100% based on the presumed deterioration of the power storage unit 10. In this case also, the same advantage can be obtained. Moreover, since the deterioration is taken into account, a more accurate state of charge can be detected, making it possible to secure sufficient electric power necessary for an emergency.

Thirteenth Embodiment

An elevator control apparatus according to a thirteenth embodiment of the present invention will be described with reference to the accompanying drawings. A construction of the elevator control apparatus according to the thirteenth embodiment of the invention is the same as that of the first embodiment discussed above.

Figure 13:
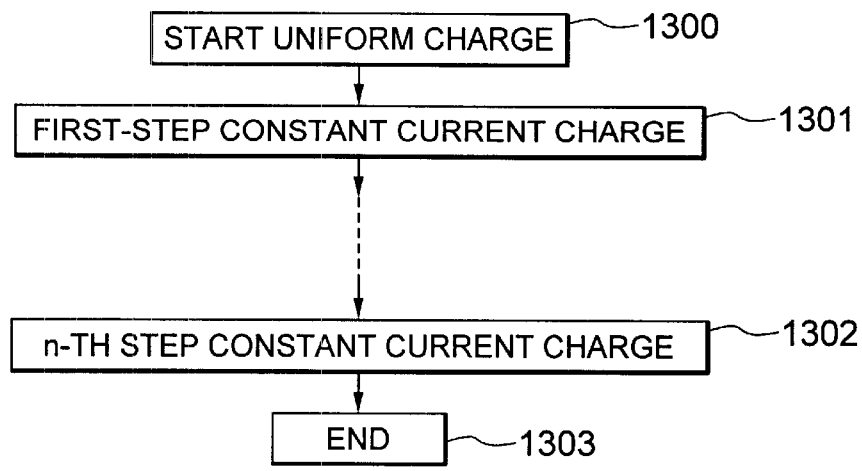
FIG. 13 is a flowchart showing uniform charging and a charge state controlling operation of an elevator control apparatus according to a thirteenth embodiment of the present invention.
Figure 14:
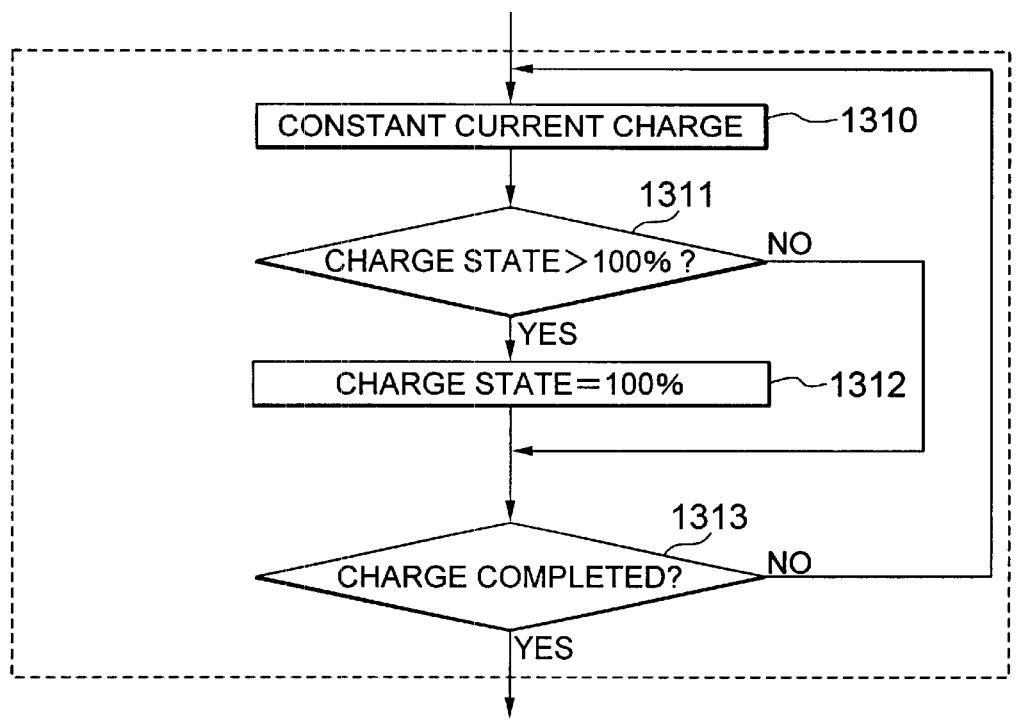
FIG. 14 is a flowchart showing a detailed operation of constant current charging of the elevator control apparatus according to the thirteenth embodiment of the present invention.

An operation of the elevator control apparatus according to the thirteenth embodiment will now be described in conjunction with the drawing. FIG. 13 is a flowchart illustrating uniform charging and an operation for controlling the charge state of the elevator control apparatus according to the thirteenth embodiment of the invention. FIG. 14 is a flowchart illustrating a detailed operation of constant current charging shown in FIG. 13.

Referring to FIG. 13, in the uniform charging, constant current charging of a plurality of steps is performed (steps 1300 through 1303). To be more specific, a charge/discharge control circuit 12 carries out constant current charging at a 12A constant current in a first step, the value of the constant current being decreased thereafter (e.g. n=5).

As shown in FIG. 14, in each step, the charge state of a power storage unit 10 is sequentially calculated by the charge/discharge control circuit 12 while the constant current charging is being implemented. When the charge state exceeds 100%, the charge state remains 100% even if further charging is carried out. Upon completion of charging, the next step is started (steps 1310 through 1313).

More specifically, for the constant current charging from, for example, the first step to a fourth step, the charge/discharge control circuit 12 starts the following step of constant current charging when a voltage detected by a voltage detector 17 reaches a predetermined voltage in a step 1313. Furthermore, in the constant current charging of a small current of the last fifth step, for example, the charge/discharge control circuit 12 decides that the charging is completed when a predetermined time passes, and terminates uniform charging in step 1313.

In the elevator control apparatus constructed and operated as described above, quicker uniform charging can be accomplished by performing constant current charging in a plurality of steps of different charging currents. In addition, electric power used for activating an inert material is not handled as accumulated electric power, thus enabling a charge state after completion of uniform charging to be accurately detected.

Fourteenth Embodiment

An elevator control apparatus according to a fourteenth embodiment of the present invention will be described with reference to an accompanying drawing. A construction of the elevator control apparatus according to the fourteenth embodiment of the invention is the same as that of the first embodiment discussed above.

Figure 15:
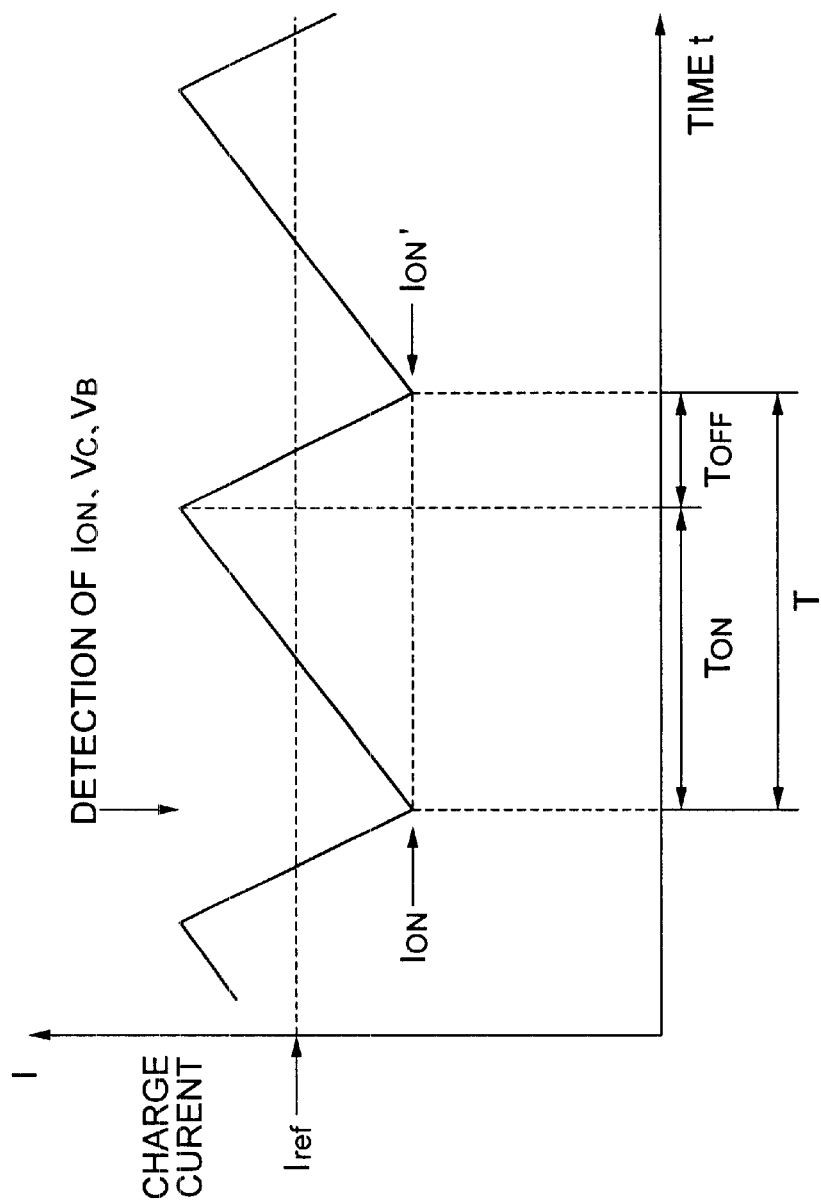
FIG. 15 is a PWM waveform chart illustrating a PWM control method of uniform charging current of an elevator control apparatus according to a fourteenth embodiment of the present invention.
Figure 16:
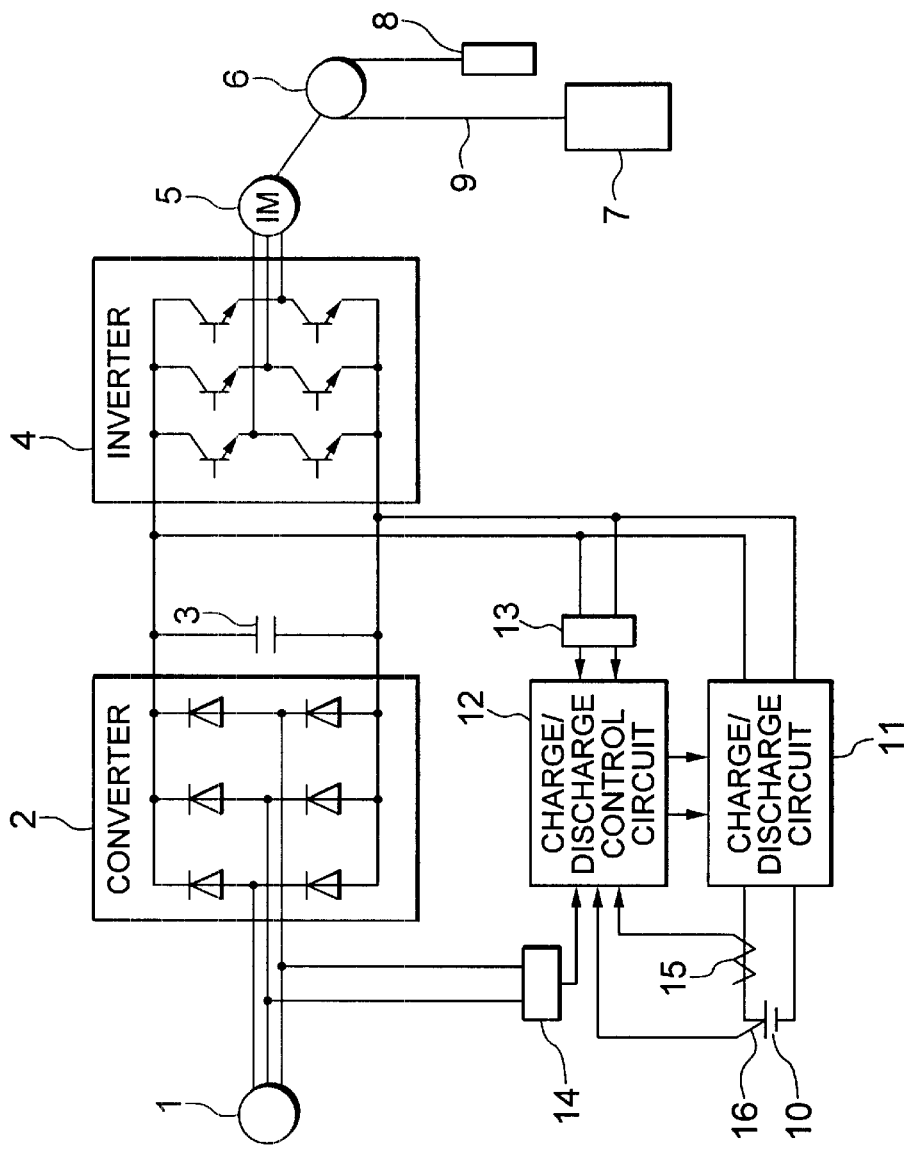
FIG. 16 is a diagram showing a construction of a conventional elevator control apparatus.

An operation of the elevator control apparatus according to the fourteenth embodiment will now be described in conjunction with the drawing. FIG. 15 is a PWM waveform diagram illustrating a PWM control method of uniform charging current of the elevator control apparatus according to the fourteenth embodiment of the invention.

Referring to FIG. 15, during a period of time of a predetermined PWM cycle T, charge current I increases during a period of time $T_{ON}$ wherein a switching device 28 is ON, while it decreases during a period of time $T_{off}$ wherein the switching device 28 is OFF. FIG. 15 shows a steady state wherein a mean current in one cycle T coincides with a current command value $I_{ref}$.

A charge/discharge control circuit 12 calculates the ON time $T_{ON}$ of the switching device 28 of a charge/discharge circuit 11 according to the current command value $I_{ref}$. First, the charge/discharge control circuit 12 detects a charge current $I_{ON}$ when the switching device 28 turns ON, a bus voltage (voltage of a capacitor 3) $V_c$, and a voltage $V_B$ of a power storage unit 10, respectively, at the beginning of the PWM cycle T, that is, when the switching device 28 turns ON, by a current detector 15 and voltage detectors 13 and 17. When the charge current is in the steady state as shown in FIG. 15, an expression (1) shown below holds, wherein L denotes inductance of a reactor 27 of the charge/discharge circuit 11:

$$I_{ON} = I_{ref} - (V_C - V_B) V_B T / 2LV_C \quad (1)$$

Hence, the mean current based on the current command value $I_{ref}$ can be controlled by controlling $I_{ON}$ having the right side of expression (1) as a command value. Thus, the charge/discharge control circuit 12 uses detected $I_{ON}$, $V_C$, and $V_B$ and constants T and L to control an end of the PWM cycle, i.e., a current $I_{ON}$, at the beginning of the next PWM cycle, and calculates $T_{ON}$ according to an expression (2) shown below, wherein $0 \leq T_{ON} \leq T$.

$$T_{ON} = (I_{ref} - I_{ON})L/V_C + (V_C + V_B)V_B T / 2V_C^2 \quad (2)$$

In the elevator control apparatus constructed and operated as described above, $T_{ON}=T$ holds from a moment immediately following a start of current control to a steady state, thus permitting the steady state to be reached most quickly.

While two values, namely, a maximum value and a minimum value, in the PWM cycle are required to be detected to calculate a mean-current, the embodiment requires only a minimum current value be detected to conduct control based on a mean current.

Furthermore, a maximum value and a minimum value do not take unique values in the control based on a mean current; hence, divergence tends to happen with a resultant increase in current ripples. In the elevator control apparatus according to this embodiment, a current value uniquely defined relative to a current command value provides a control target. This restrains the divergence, making it possible to control current ripples to designed current ripples and to restrain generation of heat of the power storage unit 10.

In the above embodiments, the descriptions have been made of the case of charging; however, the present invention can be applied in the same manner also to the case of discharging.

What is claimed is:

1. An elevator control apparatus comprising:
   a converter for rectifying AC power into DC power;
   an inverter for converting the DC power into AC power having a variable voltage and a variable frequency;
   a controller for controlling a motor, based on the AC power having the variable voltage and the variable frequency, operating an elevator;
   a power storage unit for storing the DC power;
   a charge/discharge control circuit issuing a drive signal such that discharge from the power storage unit increases within a range of power that can be discharged when an elevator is driven immediately following completion of uniform charging; and
   a charge/discharge circuit for discharging the power storage unit in accordance with the drive signal.

2. The elevator control apparatus according to claim 1, wherein the charge/discharge control circuit sets the discharge of the power storage unit to a preset maximum value until a reference charge state is reached, immediately following completion of the uniform charging.

* * * * *